No. 720,249. PATENTED FEB. 10, 1903.
J. R. HARRISON.
CONVEYER FOR THRESHING MACHINES.
APPLICATION FILED OCT. 23, 1902.
NO MODEL. 2 SHEETS—SHEET 1.
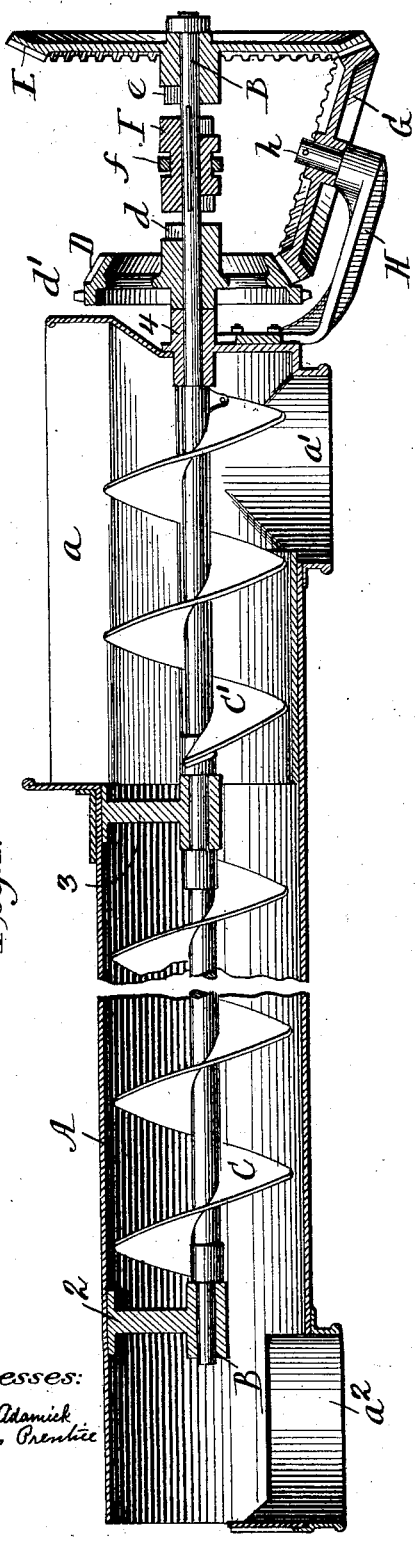
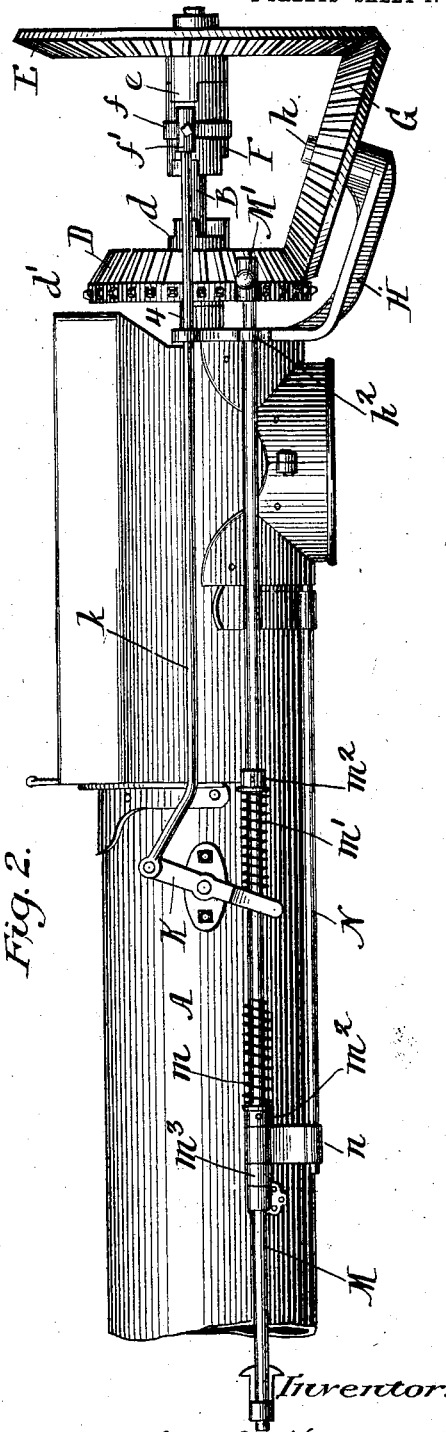

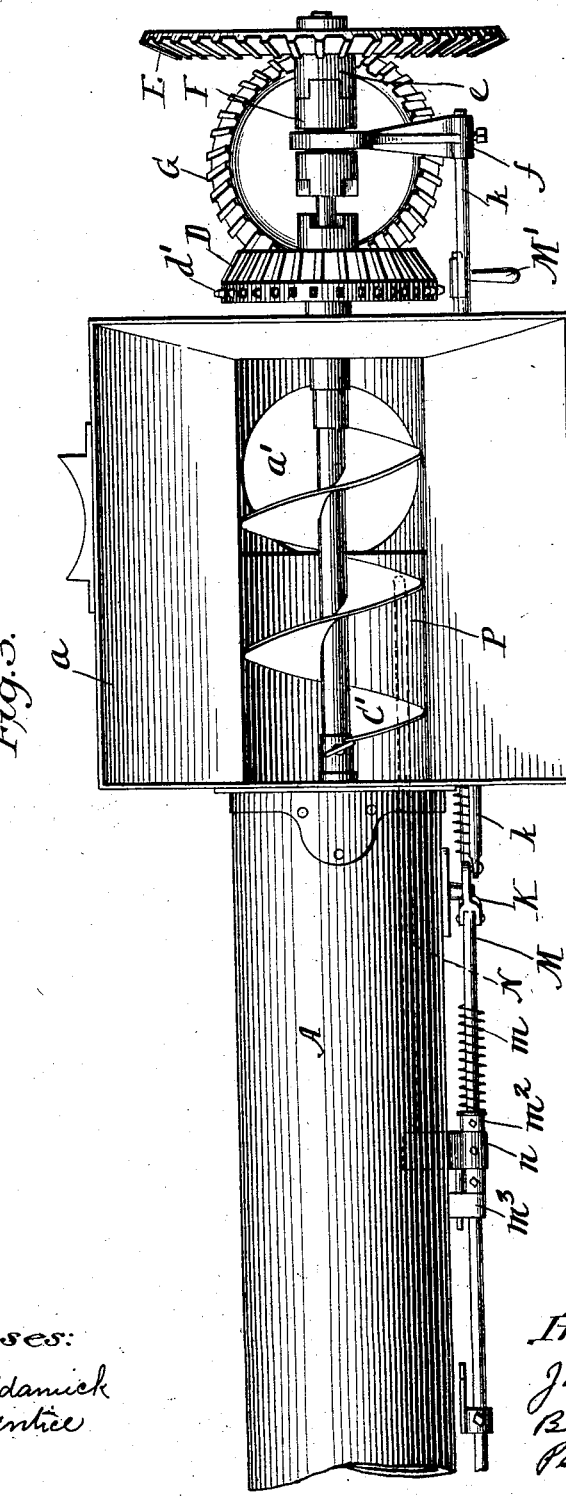

UNITED STATES PATENT OFFICE.

JAMES R. HARRISON, OF RACINE, WISCONSIN, ASSIGNOR TO HART GRAIN WEIGHER COMPANY, OF PEORIA, ILLINOIS, A CORPORATION.

CONVEYER FOR THRESHING-MACHINES.

SPECIFICATION forming part of Letters Patent No. 720,249, dated February 10, 1903.

Application filed October 23, 1902. Serial No. 128,410. (No model.)

*To all whom it may concern:*

Be it known that I, JAMES R. HARRISON, a resident of the city and county of Racine, in the State of Wisconsin, have invented certain new and useful Improvements in Cross-Conveyers for Threshing-Machines, of which the following is a full, clear, and exact description, reference being had to the accompanying drawings, forming a part of this specification.

This invention has relation to conveyers such as are mounted transversely upon the top of a threshing-machine for the purpose of causing the delivery of grain alternately at opposite sides of the machine. An example of such type of conveyer is illustrated in Letters Patent No. 626,108, granted to the J. I. Case Threshing Machine Company as assignee of Frank C. Stuckel, May 30, 1899, to which reference may be had for a fuller understanding of the purposes and accessories of this type of devices.

The object of this invention is to provide improved mechanism for driving the auger of the cross conveyer-tube; and the invention consists in the features of improvement hereinafter described and particularly pointed out in the claims at the end of the specification.

Figure 1 is a view in vertical longitudinal section through a cross-conveyer embodying this invention. Fig. 2 is a view in side elevation, one end of the conveyer-tube being omitted. Fig. 3 is a plan view of the parts illustrated in Fig. 2.

The cross conveyer-tube A will be of suitable length to extend across the top of a threshing-machine and at one end is provided with a hopper $a$ and discharge-opening $a'$, and at its opposite end is provided with a similar discharge-opening $a^2$. The hopper A is adapted to receive the grain—as, for example, from a weighing - machine such as shown in Patent No. 626,108, above mentioned. Within the conveyer is mounted a shaft B, that carries the conveyer-flights C and C', this shaft being shown as journaled in brackets 2 and 3, depending within the tube A, and as passing through a journal-bearing 4 in the end wall of the tube.

Upon the shaft B are loosely mounted two beveled gear-wheels D and E, and the hubs $d$ and $e$ of these gear-wheels are adapted to interlock with the opposing ends of a clutch F, that is mounted in manner free to slide longitudinally of the shaft B, but is keyed thereto, as by a suitable spline or equivalent joint. The beveled gear G is revolubly mounted upon the stub-axle $h$ of a bracket H, that is conveniently bolted to the end wall of the conveyer-tube D. The gear-wheel D is shown as having its rim provided with sprocket - teeth $d'$, adapted to receive a sprocket-chain that will serve to impart revolution to the shaft from some suitable moving part of the machine—as, for example, from the cross-shaft at the top of the head of the elevator, as illustrated in Patent No. 626,108. The clutch F is shown as formed with the usual annular groove to receive a clutch-arm or yoke $f$, having a sleeve $f'$, rigidly mounted upon a clutch-rod $k$, that parallels the conveyer-tube A, (see Figs. 2 and 3,) passing through an opening in the bracket H. The inner end of the clutch-rod $k$ is pivotally connected to the lever K, the lower forked end of which lever straddles the shifter-rod M between the coiled springs $m$ and $m'$, mounted upon said rod intermediate the collars $m^2$. The rod M extends alongside the conveyer-tube and is conveniently supported, as by bearings $m^3$ $h^2$ or in other suitable manner. The shifter-rod M will extend from end to end of the conveyer-tube, as in Patent No. 626,108, above mentioned; but as this rod and its attachments form no part of the present invention it has not been deemed necessary to show it in full length. At each end the rod M will be provided with a handle M', whereby it may be shifted lengthwise and may also be partly turned, as in the above-mentioned patent, and to the shifter-rod is connected one end of an arm $n$, the opposite end of which arm is attached to a sliding rod N, that passes through the side wall of the discharge-opening $a'$ and is connected to a sliding gate P, that conforms to the bottom of the hopper and is adapted to close the opening $a'$.

It will be seen that the gear-wheels D and E are of different diameters, the purpose of this being to drive the conveyer-auger at a faster speed when the grain is delivered to the discharge-opening $a^2$ than when it is delivered directly from the hopper A to the discharge-opening $a'$. Hence it will be seen that when the parts are in the position shown in Fig. 2 (at which time the discharge-opening $a'$ will be used) the clutch F will be in engagement with the gear-wheel E, and revolution will be imparted from the beveled wheel D and gear H to the gear E, the clutch F, and the shaft B. If it is desired to discharge the grain at the opposite side of the machine, the operator by grasping the handle M' will shift the rod longitudinally, so as to cause the gate P to close the opening $a'$, and as the gate reaches the end of its movement the clutch F will be brought into engagement with the hub $d$ of the gear-wheel D. Revolution will then be imparted to the auger-shaft B directly from the gear-wheel D and clutch F, while the gear-wheels G and E will run idle.

It is manifest that the precise details of structure above set out may be modified by the skilled mechanic without departing from the spirit of the invention.

Having thus described my invention, what I claim as new, and desire to secure by Letters Patent, is—

1. In a cross-conveyer, the combination with the conveyer-tube arranged to discharge the grain at its opposite ends, of a revoluble auger and shaft within said tube, said auger-shaft projecting beyond the end of said tube, oppositely-disposed beveled drive-gears loosely mounted upon the end of said auger-shaft, one of said beveled drive-gears being provided with additional teeth whereby it may be continuously driven in one direction, a clutch-sleeve splined to said shaft and arranged to engage one or the other of said beveled drive-gears and a beveled idler-gear meshing with each of said beveled drive-gears.

2. In a cross-conveyer, the combination with a conveyer-tube arranged to discharge the grain at its opposite ends, of a revoluble auger and shaft within said tube, said auger-shaft projecting beyond the end of said tube, oppositely-disposed beveled drive-gears of different diameters loosely mounted upon the end of said auger-shaft, one of said beveled drive-gears being provided with sprocket-teeth whereby it may be continuously driven in one direction, a clutch-sleeve splined to said shaft and arranged to engage one or the other of said beveled drive-gears, a beveled idler-gear meshing with each of said beveled drive-gears and a bracket secured to the end of said conveyer-tube whereon said beveled idler-gear is revolubly mounted in inclined position.

JAMES R. HARRISON.

Witnesses:
  ORSON Z. OLIN, Jr.,
  EDWIN E. RUSSELL.